United States Patent Office 3,629,139
Patented Dec. 21, 1971

3,629,139
SILICA ORGANOSOLS AND PROCESS
FOR MAKING
Peter H. Vossos, Berwyn, Ill., assignor to
Nalco Chemical Company
No Drawing. Filed Mar. 13, 1969, Ser. No. 807,107
Int. Cl. B01j 13/00
U.S. Cl. 252—309                10 Claims

ABSTRACT OF THE DISCLOSURE

Silica organosols comprising an organic solvent having uniformly dispersed therein from 0.1% to 50% by weight of discrete, dense colloidal particles of amorphous silica have adsorbed upon their surfaces a quaternary ammonium salt or hydroxide. A method of preparing these silica organosols is disclosed.

INTRODUCTION

Silica organosols are well known in the art. The organosols are used in lubricating oils and greases, fillers for rubber products, and thickening agents in certain organic systems. Organosols are beneficial in preparing water repellent coatings for a variety of surfaces such as textiles, plastics, rubber and similar products.

The organosols known to those skilled in the art have many inherent disadvantages. In Iler U.S. Pat. 2,801,185 a method is shown of preparing finely divided colloidal silica dispersed in organic liquids. The process uses aqueous silica sols as starting materials. However it is necessary to work with dilute aqueous sols and to carry out various reaction steps before the end products are produced. Therefore, it would be a great advantage in the art if there was a method of producing organosols using concentrated aqueous sols and a simple one- or two-step process. These organosols would have to be stable over a long period of time.

Iler U.S. Pat. 2,692,863 teaches a process for preparing a silica organosol, using a quaternary ammonium base to coat the silica particles and extracting the coated particles from the aqueous solvent to the organic solvent. But this too contains some relevant disadvantages. A brine solution is often necessary to extract the colloidal silica particles from the aqueous to the organic solvent. Even with the brine, 100% extraction is not achieved. Other methods of removing the aqueous solvent from the composition are also undesirable. For example, azeotropic distillation could be used, but this further complicates the process of making the organosol.

Another significant disadvantage of the cited patent is that the starting materials are often expensive.

Since the organosols known to the prior art are relatively dilute, the cost of the organosols to the users is increased since transportation and packaging costs are increased due to the large percentage of the solvent present.

A further disadvantage of Iler U.S. Pat. 2,692,863 is that the aqueous silica particles are precipitated when the aqueous silica sol is added to the organic solvent. If there is a time delay, gelation or excess precipitation can result. Therefore it is necessary to complete this multi-stage process quickly. It would be an advantage to the art if there was no need to precipitate the silica particles from the aqueous silica solvent.

It would be a great advantage to the art if a simple means could be devised for making an organsol in a concentrated, stable condition. This process should be rapid and contain as few steps as possible. There should also be a means of easily separating the aqueous from the organic solvent. It would be a further advantage to the art if the organosol could be easily concentrated without causing gellation or precipitation of the colloidal silica particles. The organic solvent should be capable of being easily removed so that oleophilic silica powders could be formed. Such powders advantageously should be easily redispersed in organic solvents.

OBJECTS

It is an object of this invention to prepare stable organosols which contain a high concentration of silica particles.

Another object is to prepare an organosol by using an aqueous silica sol without the need to precipitate the silica particles. A simple process should be devised so that the silica particles can be extracted from the aqueous layer into an organic solvent without going through the step of precipitation and redispersion.

A further object is to provide an easy method for separating the aqueous layer from the organosol product without the need for a brine solution or azeotropic distillation.

Another object is to prepare an organosol which can be easily concentrated by evaporation of some of the organic solvent or even by evaporation of all of the organic solvent to produce dry, free flowing, oleophilic silica powders.

Further objects will be revealed in this description and should be readily apparent to those skilled in the art.

INVENTION

The products produced are silica organosols consisting of an organic solvent which contains uniformly dispersed therein discrete, dense colloidal particles of amorphous silica. The organic solvent is nonpolar and aliphatic. This solvent contains from 5–10 carbon atoms. In this organic solvent are uniformly dispersed discrete, dense colloidal particles of amorphous silica. These silica particles are from 0.1% to 50% by weight of the total composition. These silica particles have an average particle diameter of from 3 to 150 millimicrons and an average surface area of from 20 m.²/g. to 1000 m.²/g. These silica particles have adsorbed upon their surfaces a quaternary ammonium salt or hydroxide.

The quaternary ammonium compound has the formula:

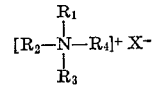

where $R_1$ is a hydrocarbon group consisting of from 6–8 carbon atoms, $R_2$, $R_3$ and $R_4$ are hydrocarbon groups containing from 1–8 carbon atoms each, and X is an anion selected from the group consisting of chloride, bromide, iodide, and hydroxide. As will be noticed at least one of the hydrocarbon groups contains from 6–8 carbon atoms. The other three hydrocarbon groups contain from 1–8 carbon atoms. None of the hydrocarbon groups exceed 8 carbon atoms. The hydrocarbon groups can be straight or branch chained, saturated or unsaturated, aliphatic or aromatic. The preferred quaternary ammonium compound is tricaprylylmethyl ammonium chloride. As can readily be seen in this preferred embodiment, $R_1$ contains 8 carbon atoms, $R_2$ and $R_3$ each contain 8 carbon atoms, $R_4$ contains 1 carbon atom, and X is the chloride ion. This specific quaternary ammonium compound has known uses such as in uranium processing. Therefore, instead of describing the specific R groups, this compound will be hereafter referred to in this application by its common name.

The amount of the quaternary in relation to the silica depends upon the particle size of the colloidal silica. The smaller the particle size, the more quaternary will be required. In general, the ratio of $SiO_2$ to quaternary will be from 25 to 1 to 2 to 1. For an average particle diameter of 20 millimicrons a ratio of about 6 to 1 should be used.

The organosol by itself can be a useful product. However, the solvent can be removed and a dry free flowing powder recovered. This powder can be redissolved in organic solvents to give back an organosol. The quaternary ammonium salt or hydroxide could be tricaprylyl benzyl ammonium salt, dicaprylyl dimethyl ammonium salt, tricaprylyl ethyl ammonium salt, tetracaprylyl ammonium salt, or various other quaternary ammonium salts or hydroxides known to those skilled in the art. The preferred quaternary ammonium salt, as previously mentioned, is tricaprylyl methyl ammonium chloride. The tricaprylyl methyl ammonium chloride is readily available commercially. The hydroxide form of the quaternary ammonium salts can be easily prepared by passing a 50% solution of the chloride form in isopropanol through an anion exchange column in the OH-form.

The process for making the organosols is relatively simple. The quaternary ammonium salt or hydroxide is dissolved in the nonpolar aliphatic organic solvent. An aqueous silica sol containing from 20–60% of discrete, dense colloidal particles of amorphous silica is then added to the organic solvent. The preferred method is to add the organic solvent to the silica sol. This achieves more efficient mixing. Either addition takes from 5–60 minutes. The colloidal particles of amorphous silica are coated with the quaternary ammonium salt or hydroxide. The result is that the silica is completely transferred from the aqueous to the organic phase and is uniformly dispersed therein.

The temperature for carrying out this process can range from 20–70° C. Essentially, this reaction can be carried out at any temperature from about room temperature to the boiling point of the organic solvent.

The uniform dispersion is then allowed to separate into an organic and aqueous layer. The aqueous layer can be withdrawn and discarded, since the organic layer now contains the coated silica particles. From 98–100% of the silica particles are extracted into the organic phase. The organic layer is now our finished product which is an organosol containing from 0.1 to 50% by weight of the discrete, dense colloidal particles of amorphous silica which have been coated with quaternary ammonium salt or hydroxide.

If a higher concentration of the silica particles in the organic solvent is desired, the organosol can be concentrated by merely evaporating some of the organic solvent from the finished product. If a free flowing, dry silica powder is desired, which can be readily dispersed in other organic solvents, all of the organic solvent of the organosol is evaporated. The result is discrete, dense silica particles with uniformly coated surfaces of quaternary ammonium salt or hydroxide.

STARTING AQUEOUS SILICA SOLS

Generally, any aqueous silica sol can be used for this invention. These are well known to the art. The starting aqueous silica sol can range from 20 to 60% by weight of discrete, dense colloidal particles of amorphous silica. The average particle diameter can range from 3 to 150 millimicrons and can have an average surface area from 20 m.²/g. to 1000 m.²/g. It is preferred that the starting aqueous silica sol be from 30 to 50% by weight of discrete, dense colloidal particles of amorphous silica. The preferred particle diameter should range from 16 to 20 millimicrons and have an average surface area from 150 to 190 m.²/g.

The following is a table of commercially available aqueous silica sols. These are sold by Nalco Chemical Company under the trademark Nalcoags.

TABLE I

| Nalcoag | 1030 | 1034A | 1035 | 1050 | 1060 | 1130 | 1140 |
|---|---|---|---|---|---|---|---|
| Percent colloidal silica, as SiO₂ | 30 | 34 | 35 | 50 | 50 | 30 | 40 |
| pH | 10.2 | 3.1 | 8.6 | 9.0 | 8.5 | 10 | 10 |
| Ave. particle size, millimicrons | 11-16 | 16-22 | 16-22 | 17-25 | 40-60 | 8 | 15 |
| Ave. surface area m.²/gram | 109-270 | 135-190 | 135-190 | 120-176 | 50-75 | 375 | 200 |
| Specific gravity at 68° F | 1.205 | 1.230 | 1.255 | 1.385 | 1.390 | 1.214 | 1.296 |
| Viscosity at 77° F. cps | <5 | <5 | 5 | 70 | 5-10 | 7 | 8 |
| Na₂O, percent | 0.40 | <0.01 | 0.10 | 0.30 | 0.10 | 0.65 | 0.40 |

ORGANIC SOLVENTS

The organic solvents used in this invention should be nonpolar, aliphatic, and contain from 5 to 10 carbon atoms. The solvent can be straight or branch chained, saturated or unsaturated. Available solvents include but are not restricted to pentane, hexane, heptane, octane, nonane, iso-octane, decane, and pentyne. The preferred nonpolar, aliphatic organic solvent is hexane. Since the organosol product should not contain water, the organic solvent must be non-water miscible.

EXAMPLES

In order that the invention may be better understood the following specific illustrative examples are given.

EXAMPLE I

A 30 g. aliquot of tricaprylyl methyl ammonium chloride was added to 200 grams of hexane with vigorous agitation. This was done at room temperature. After the tricaprylyl methyl ammonium chloride was completely dissolved, this hexane and salt solution was added to 275 ml. of a colliodal aqueous silica sol, namely Nalcoag 1130 as described in the above table, with agitation.

This addition was done slowly so that the silica sol particles did not precipitate or gel and so that all the silica particles are extracted into the hexane. When the addition was complete this uniform dispersion was allowed to separate into an organic and an aqueous layer in a separatory funnel. When the separation was complete, the aqueous layer was withdrawn and discarded. The organic layer was now our completed organosol product.

EXAMPLE II

A 15 g. portion of tricaprylylmethyl ammonium hydroxide was added with vigorous agitation at room temperature to 125 g. of hexane. When the tricaprylylmethyl ammonium hydroxide was dissolved in the organic solvent, 145 milliliters of Nalcoag 1050 was added with vigorous agitation. This addition was performed slowly so that the silica sol particles did not precipitate or gel. A uniform dispersion was achieved. This uniform dispersion was allowed to separate into an aqueous and an organic layer. The aqueous layer was discarded; the organic layer was a complete organosol product. The aqueous layer contained no silica particles.

A portion of the above organosol product was evaporated to dryness to determine the percentage of silica particles in the organosol. Analysis showed 48% silica particles. The evaporation technique of the organic solvent was also used to produce the dry free-flowing oleophilic silica powder.

EXAMPLE III

The same procedure was followed as in Example II, except that in place of hexane, heptane was used. An organosol product was obtained in which the silica particles were stably dispersed in the heptane.

EXAMPLE IV

The organosol product was recovered as in Example I and then the nonpolar aliphatic organic solvent was partially evaporated to increase the silica concentration in the organosol. A concentration of silica particles in the organosol was achieved of 50%. The organosol was still stable. The organosols when concentrated to 50–70% of silica particles are still stable. There was no precipitation and no gelling.

EXAMPLE V

The same method of producing the organosol product was followed as in Example I. The solvent was then evaporated to dryness to produce a dry, free flowing silica powder. The resulting powder was added to a solution of hexane. The oleophilic powder readily dispersed in the hexane.

EXAMPLE VI

The same method of producing the organosol was followed as in Example I except that instead of using the tricaprylyl methyl ammonium chloride other quaternary ammonium salts were used such as tricaprylyl benzyl ammonium chloride, dicaprylyl dimethyl ammonium salts, tricaprylyl ethyl ammonium salt and tetracaprylyl ammonium salt.

CONCLUSION

According to this invention, an organosol product is disclosed. This organosol is an organic solvent having uniformly dispersed therein discrete, dense colloidal particles of amorphous silica, said silica particles having absorbed upon their surfaces the quaternary ammonium salt or hydroxide, previously described. The product has many commercial uses previously listed.

An easy method of preparation of the product is disclosed. This consists merely of dissolving the quaternary ammonium salt in the organic solvent and then adding this to an aqueous silica sol. The water layer readily separates to give the organosol product. The invention is hereby claimed as follows:

1. An organosol consisting essentially of a nonpolar, aliphatic organic hydrocarbon solvent, which contains from 5–10 carbon atoms having uniformly dispersed therein from 0.1% to 50% by weight of discrete, dense colloidal particles of amorphous silica having an average particle diameter of from 3–150 millimicrons and an average surface area of from 20 $M^2/g$. to 1000 $M^2/g$., said silica particles having adsorbed upon their surfaces a quaternary ammonium salt or hydroxide, with the weight ratio of silica, expressed as $SiO_2$ to the quaternary ammonium salt or hydroxide being at least 2:1, wherein the quaternary ammonium compound has the formula:

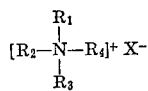

where $R_1$ is a hydrocarbon group consisting of from 6–8 carbon atoms, $R_2$, $R_3$, and $R_4$ are hydrocarbon groups containing from 1–8 carbon atoms each, and X is an anion selected from the group consisting of chloride, bromide, iodide, and hydroxide.

2. The organosol of claim 1 wherein the nonpolar, aliphatic organic hydrocarbon solvent is hexane.

3. The organosol of claim 1 wherein the discrete, dense colloidal particles of amorphous silica have an average particle diameter of from 16 to 20 millimicrons and an average surface area of from 150 to 190 $M.^2/g$.

4. The organosol of claim 1 wherein the nonpolar, aliphatic organic hydrocarbon solvent is hexane, wherein the discrete, dense colloidal particles of amorphous silica have an average particle diameter of from 16 to 20 millimicrons and an average surface area of from 150 to 190 $M.^2/g$., and wherein the weight ratio of silica, expressed as $SiO_2$, to quaternary ammonium salt or hydroxide is 6:1.

5. The organosol of claim 1 wherein the quaternary ammonium salt is tricaprylyl methyl ammonium chloride.

6. A method for making an organosol which comprises the steps of:
   (1) dissolving a quaternary ammonium compound having the formula:

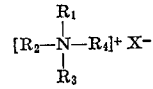

where $R_1$ is a hydrocarbon group consisting of from 6–8 carbon atoms, $R_2$, $R_3$, and $R_4$ are hydrocarbon groups containing from 1–8 carbon atoms each, and X is an anion selected from the group consisting of chloride, bromide, and hydroxide, at a temperature in the range of from 20° to 70° C. in a nonpolar aliphatic organic hydrocarbon solvent which contains from 5 to 10 carbon atoms,
   (2) adding the above solvent containing salt to an aqueous silica sol which contains from 20 to 60% of discrete, dense colloidal particles of amorphous silica being completely transferred from the aqueous to the organic phase, and being uniformly dispersed therein,
   (3) allowing this uniform dispersion to separate into an organic and an aqueous layer,
   (4) separating the organic layer from the aqueous layer and then,
   (5) recovering as a product the organic layer which is an organosol containing a nonpolar, aliphatic organic hydrocarbon solvent which contains from 5 to 10 carbon atoms having uniformly dispersed therein from 0.1% to 50% by weight of discrete, dense colloidal particles of amorphous silica having an average particle diameter of from 3 to 150 millimicrons and an average surface area of from 20 $m.^2/g$. to 1000 $m.^2/g$., wherein said silica particles have absorbed upon their surfaces the quaternary ammonium salt or hydroxide.

7. The method of claim 6 wherein the nonpolar aliphatic organic hydrocarbon solvent is partially evaporated to increase the silica concentration in the organosol.

8. The method of claim 6 wherein the nonpolar, aliphatic organic hydrocarbon solvent is hexane and the quaternary ammonium salt is tricaprylyl methyl ammonium chloride.

9. The method of claim 6 where the discrete, dense colloidal particles of amorphous silica have an average particle diameter of from 16 to 20 millimicrons and an average surface area of from 150 to 190 $m.^2/g$.

10. The method of producing an oleophilic silica powder which comprises the steps of:
    (1) dissolving a quaternary ammonium compound having the formula:

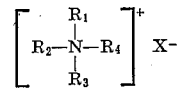

where $R_1$ is a hydrocarbon group consisting of from 6–8 carbon atoms, $R_2$, $R_3$, and $R_4$ are hydrocarbon groups containing from 1–8 carbon atoms each, and X is an anion selected from the group consisting of chloride, bromide, and hydroxide, at a temperature in the range of from 20° to 70° C. in a nonpolar aliphatic organic hydrocarbon solvent which contains from 5 to 10 carbon atoms,
    (2) adding the above solvent containing salt to an aqueous silica sol which contains from 20 to 60% of discrete, dense colloidal particles of amorphous silica being completely transferred from the aqueous to the organic phase, and being uniformly dispersed therein,
    (3) allowing this uniform dispersion to separate into an organic and an aqueous layer, (4) separating the organic layer from the aqueous layer and then, (5) recovering as a product the organic layer which is an organosol containing a nonpolar, aliphatic organic hydrocarbon solvent which contains from 5 to 10 carbon atoms having uniformly dispersed therein from 0.1% to 50% by weight of discrete, dense colloidal particles of amorphous silica having an average particle diameter of from 3 to 150 millimicrons and an average surface area of from 20 m.$^2$/g. to 1000 m.$^2$/g., wherein said silica particles have absorbed upon their surfaces the quaternary ammonium salt or hydroxide, (6) evaporating the aliphatic organic solvent, and then (7) recovering the resultant oleophilic silica powder.

References Cited
UNITED STATES PATENTS

| | | | |
|---|---|---|---|
| 2,859,234 | 11/1958 | Clem | 252—309 |
| 2,976,250 | 3/1961 | Walford | 252—313 S |

JOHN D. WELSH, Primary Examiner

U.S. Cl. X.R.

106—308, 117—100